(12) United States Patent  (10) Patent No.: US 7,630,104 B2
Yokomichi  (45) Date of Patent: Dec. 8, 2009

(54) IMAGE SENSOR

(75) Inventor: Masahiro Yokomichi, Chiba (JP)

(73) Assignee: Seiko Instruments Inc. (JP)

( * ) Notice: Subject to any disclaimer, the term of this patent is extended or adjusted under 35 U.S.C. 154(b) by 815 days.

(21) Appl. No.: 11/362,653

(22) Filed: Feb. 27, 2006

(65) Prior Publication Data

US 2006/0192871 A1 Aug. 31, 2006

(30) Foreign Application Priority Data

Feb. 28, 2005 (JP) ............................. 2005-054178

(51) Int. Cl.
*H04N 1/04* (2006.01)
*H04N 9/64* (2006.01)
*H04N 3/14* (2006.01)

(52) U.S. Cl. ...................... 358/482; 348/249; 348/294; 348/295

(58) Field of Classification Search ................ 356/478; 257/444; 382/312; 358/471, 474, 476, 482, 358/483, 497; 348/38, 46, 229.1, 230.1, 348/249, 272, 282, 294, 295
See application file for complete search history.

(56) References Cited

U.S. PATENT DOCUMENTS

| 4,772,957 | A  | * | 9/1988  | Nakagawa et al. | .......... | 358/463   |
| 4,893,186 | A  | * | 1/1990  | Mulder          | ........... | 348/295   |
| 5,146,074 | A  | * | 9/1992  | Kawahara et al. | ........ | 250/208.1 |
| 5,998,818 | A  | * | 12/1999 | Kumagai et al.  | ............ | 257/291   |
| 6,097,509 | A  | * | 8/2000  | Masaoka         | ..................... | 358/482   |
| 6,144,466 | A  | * | 11/2000 | Mizutani et al. | ............ | 358/482   |
| 6,157,231 | A  | * | 12/2000 | Wasson          | ..................... | 327/156   |
| 6,510,202 | B2 | * | 1/2003  | Tamura et al.   | .............. | 378/155   |
| 7,271,758 | B2 | * | 9/2007  | Piasecki et al. | ............. | 341/172   |
| 2008/0151088 | A1 | * | 6/2008 | Frey et al.    | .................... | 348/308   |

* cited by examiner

*Primary Examiner*—Jerome Grant, II
(74) *Attorney, Agent, or Firm*—Adams & Wilks

(57) ABSTRACT

Provided is an image sensor capable of outputting an image signal in accordance with a data loading position of a signal processing IC. In the image sensor that can arbitrarily select the start position of an output signal of a first photoelectric conversion element, a first input terminal of a scanning circuit of a photoelectric conversion circuit is connected to a selector circuit of a signal start position, and the selector circuit is controlled by a start signal through a start signal terminal and a delay circuit according to an external control signal.

3 Claims, 5 Drawing Sheets

IMAGE SENSOR

BACKGROUND OF THE INVENTION

1. Field of the Invention

The present invention relates to a linear image sensor for receiving a reflected light from an original that is irradiated with light and converting the reflected light into an electric signal, which is applied to an image reader such as a FAX machine, a scanner, or a copying machine.

2. Description of the Related Art

FIG. 5 is a circuit diagram showing a conventional image sensor. The conventional image sensor is formed of plural photoelectric conversion elements 101 and plural read switching elements 102 each of which are connected in parallel, a scanning circuit 103 that controls the read switching elements 102, a switching element 107 that outputs signals from the read switching elements 102, a control circuit 106 that controls the switching element 107, a scanning input signal producing circuit 104, and a scanning output signal producing-circuit 105 (refer to JP 01-298863 A (page 3, FIG. 1)).

The scanning circuit 103 is formed of a shift register which is formed of n data flip flop circuits, and an input terminal of the scanning circuit 103 is inputted with a scanning pulse through the scanning input signal producing circuit 104 that is connected in series. The scanning circuit 103 controls the read switching elements 102 so as to output an image signal to an image signal output terminal 108 in synchronism with a clock signal from a clock input terminal 109.

Plural image sensor ICs are linearly mounted on a substrate to constitute a linear image sensor.

SUMMARY OF THE INVENTION

However, the conventional image sensor of that type outputs a first photoelectric conversion element signal in synchronism with a first clock signal immediately after a start signal is inputted. As a result, the conventional image sensor has such a problem in that the outputs of over ten pixels of the photoelectric conversion elements cannot be loaded in such a specification that the data loading start position of the signal processing IC that inputs and processes an image signal that has been outputted by the image sensor is delayed by several clocks to over ten clocks.

The present invention has been made to solve the above problem with the conventional image sensor, and therefore an object of the present invention is to provide an image sensor which is capable of outputting an image signal in accordance with a data loading start position of the signal processing IC.

In order to achieve the above object, according to the present invention, there is provided an image sensor having plural image sensor ICs arranged linearly, in which a delay circuit that delays a start signal and a generator circuit of the start signal of the subsequent image sensor IC is connected to a scanning circuit array that scans the photoelectric conversion element within the image sensor IC through the selector circuit, and an external control signal is inputted to the selector circuit so as to be selectively delayed.

According to the image sensor of the present invention, even in a specification in which the data loading start position of the signal processing IC is delayed by several clocks to over then clocks, it is possible to obtain an image sensor capable of loading an output signal from a first photoelectric conversion element.

DETAILED DESCRIPTION OF THE PREFERRED EMBODIMENTS

Now, a description will be given in more detail of preferred embodiments of the present invention with reference to the accompanying drawings.

Figure 1:
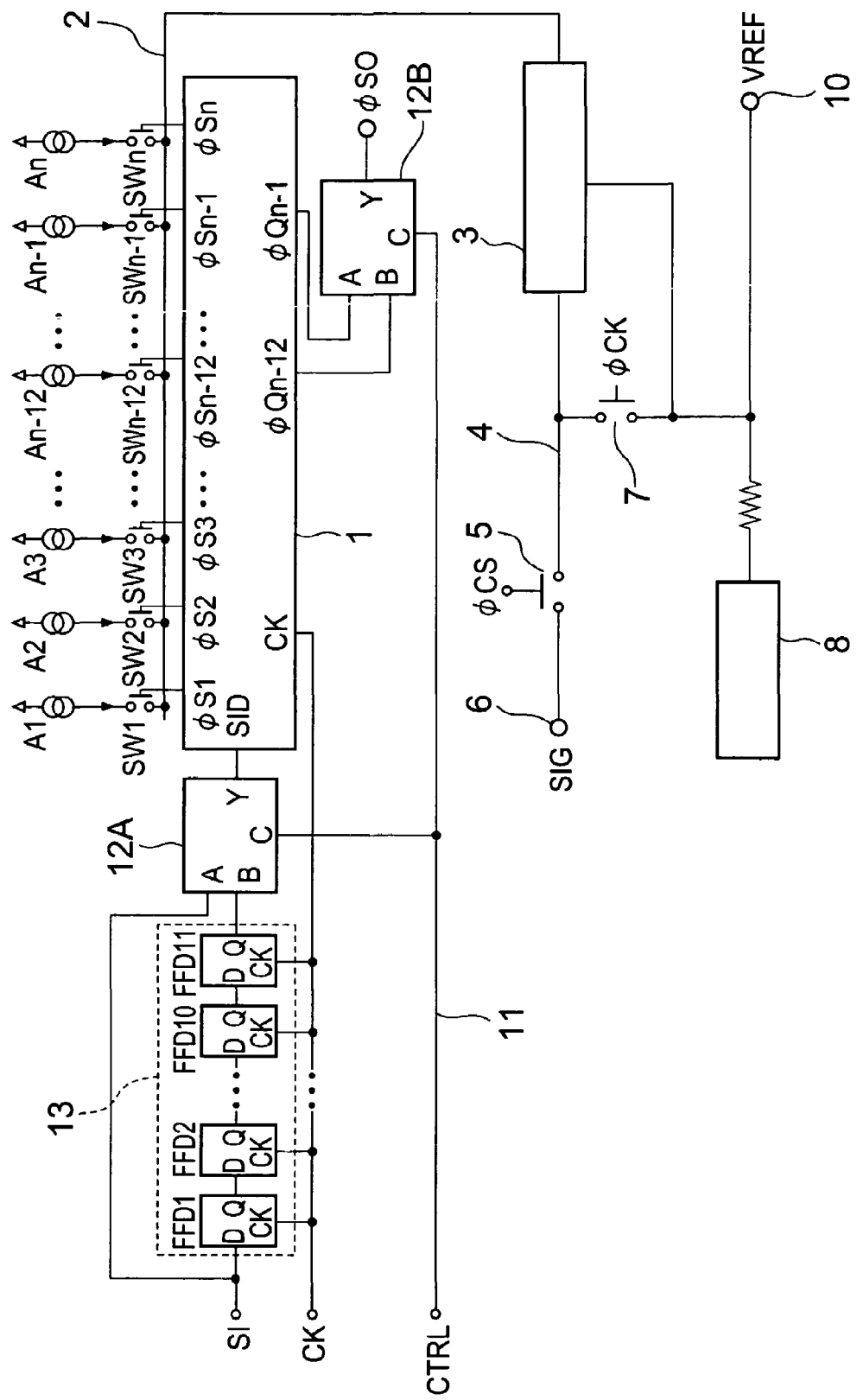
FIG. 1 is a circuit diagram showing an image sensor according to the present invention.

FIG. 1 is a circuit diagram showing an image sensor according to the present invention. In the image sensor, output terminals of plural photoelectric conversion element array A1, A2 ... An are connected to corresponding input terminals of plural read switching elements SW1, SW2 ... SWn, control terminals of the respective read switching elements are connected to corresponding output terminals S1, S2 ... Sn of a scanning circuit array 1, and output terminals of the respective switching elements are connected to a first common signal line 2.

The first common signal line 2 is connected to a first input terminal of a reset and control circuit 3, and an output terminal of the reset and control circuit 3 is connected to a common signal line 4, and the second common signal line 4 is connected to an input terminal of a chip select switch element 5 and an output terminal of a clamp switch element 7. An output terminal of the chip select switch terminal 5 is connected to an image signal output terminal 6. A second input terminal of the reset and control circuit 3 and an input terminal of the clamp switch element 7 are short-circuited with each other, and connected to a reference voltage output terminal 10 that gives a reset potential and a first terminal of a resistor 9. A second terminal of the resistor 9 is connected to an output terminal of a reference voltage generating circuit 8.

A delay circuit 13 is a shift resistor that is formed of 11 data flip flop circuits FFD1, FFD2 ... FFD11, a Q output of an eleventh data flip flop circuit FFD11 is connected to an input B of a selector circuit 12A, and an output Y of the selector circuit 12A is connected to a data input SID of the scanning circuit array 1.

A common signal line 11 of a signal start position control terminal CTRL is connected to an input C of the signal start position selector circuit 12A and an input C of a subsequent chip start signal selector circuit 12B, and a start signal SI is connected to an input D of the first data flip flop circuit FFD1 of the delay circuit 13 and an input A of the selector circuit 12A. The scanning circuit array 1 is a shift register that is formed of n data flip flop circuits. An output Qn-1 of an (n-1)th data flip flop circuit is connected to the input A of the selector circuit 12B, and an output Qn-12 of an (n-12)th output data flip flop circuit is connected to the input B of the selector circuit 12B, and the output C of the selector circuit 12B is connected to an SO output.

In this embodiment, the delay circuit 13 is a shift register that is formed of 11 data flip flop circuits, but may be formed of m data flip flop circuits. In this case, the output Qn-1-*m* of the (n-1-m)th scanning circuit array 1 may be connected to the input B of the selector circuit 12B. Also, the delay circuit 13 is the shift register that is formed of 11 data flip flop circuits, but may be formed of a frequency divider circuit.

Figure 2:
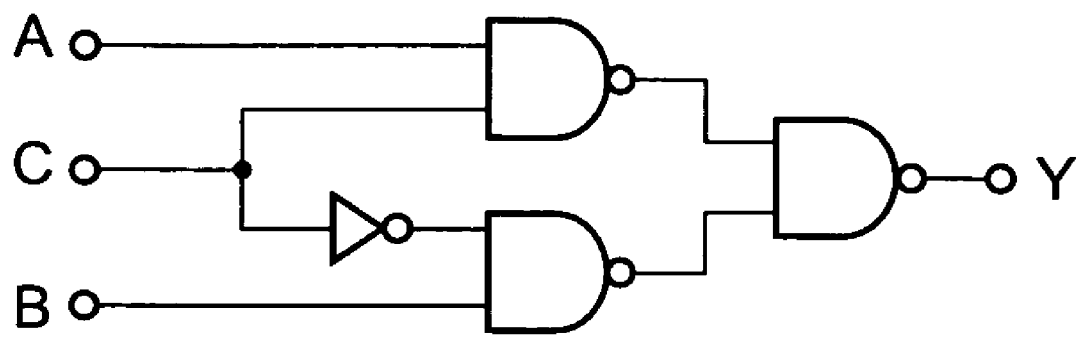
FIG. 2 is a circuit diagram showing an example of a selector circuit in the image sensor according to the present invention.

FIG. 2 is a circuit diagram showing an example of the selector circuit of the image sensor according to the present invention. The selector circuit is formed of a NAND gate that outputs a signal of an input A from an output Y when an input C is high, and outputs a signal of an input B from the output Y when the input C is low. For convenience, in this embodiment, the selector circuit is formed of the NAND gate but may be structured by a NOR gate.

Figure 3:
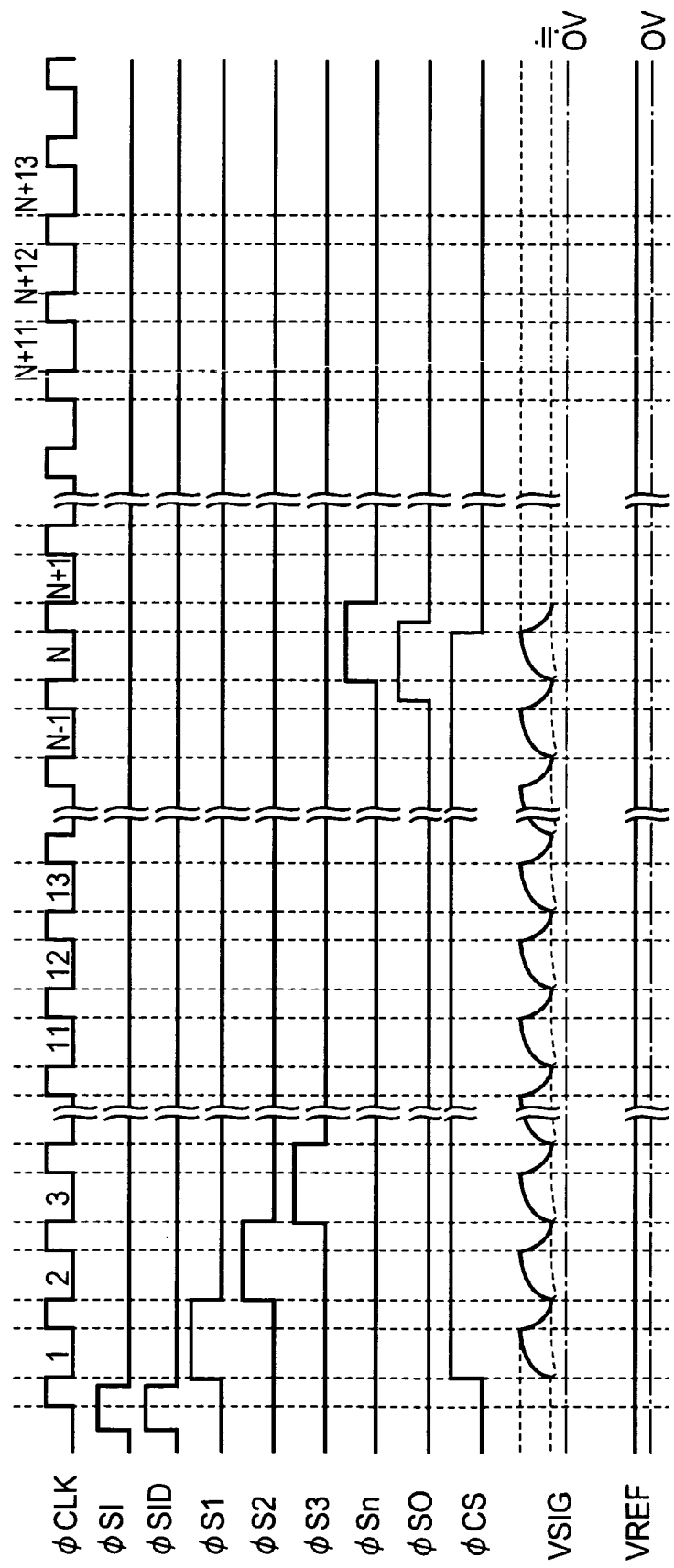
FIG. 3 is a timing chart of the image sensor according to the present invention in the case where a start signal is not delayed.

FIG. 3 is a timing chart of the image sensor according to the present invention in the case where a start signal is not delayed. Reference symbol ØCLK indicates a clock pulse, ØSI is the start signal, and S1, S2, S3 . . . Sn are signals that control the respective read switching elements. The scanning circuit array 1 is the shift register that is formed of n or more flip flop circuits, and generates scanning signals that render the read switching elements sequentially conductive one by one. In ØSID, because CTRL is high, the start signal ØSI is outputted from the output Y of the selector circuit 2A, and the first output S1 of the scanning circuit array 1 is outputted from a first clock upon inputting the start signal ØSI. Reference symbol ØSO indicates a start signal of the subsequent image sensor, and the output signal Qn-1 of the scanning circuit array 1 is outputted from the output Y of the selector circuit 2B. Reference symbol ØCS indicates a control signal of the chip select switch element and is rendered conductive until the n-bit image signals of the image sensor which has been selected according to the start signal SID have been completely outputted. All of them are rendered conductive at a high level, and non-conductive at a low level. VSIG is an image signal output that has been subjected to photoelectric conversion. Reference symbol VREF indicates a reference voltage that is generated in a reference voltage generator circuit of the image sensor, or a reference voltage that is supplied through the reference voltage terminal VREF from the external.

As described above, with the operation of the respective switching elements, the image signal that has been obtained by, for example, the first photoelectric conversion element A1 is inputted with ØSI, and when the first switching element SI is rendered conductive at the first clock, the first common signal line is read. After the image signal has been sufficiently read, the image signal is reset to the reference voltage VREF through the read switching element S1 by the reset and control circuit in a period when ØCLK is at a high level. In addition, the image signal is clamped to the reference voltage VREF by the clamp switch element in the second common signal line in a period when ØCLK is at the high level.

The above operation is sequentially repeated, the plural read switching elements are controlled, and the image signal is read on the basis of a dark-time output as the reference voltage VREF, to thereby obtain the operation of a line image sensor.

Figure 4:
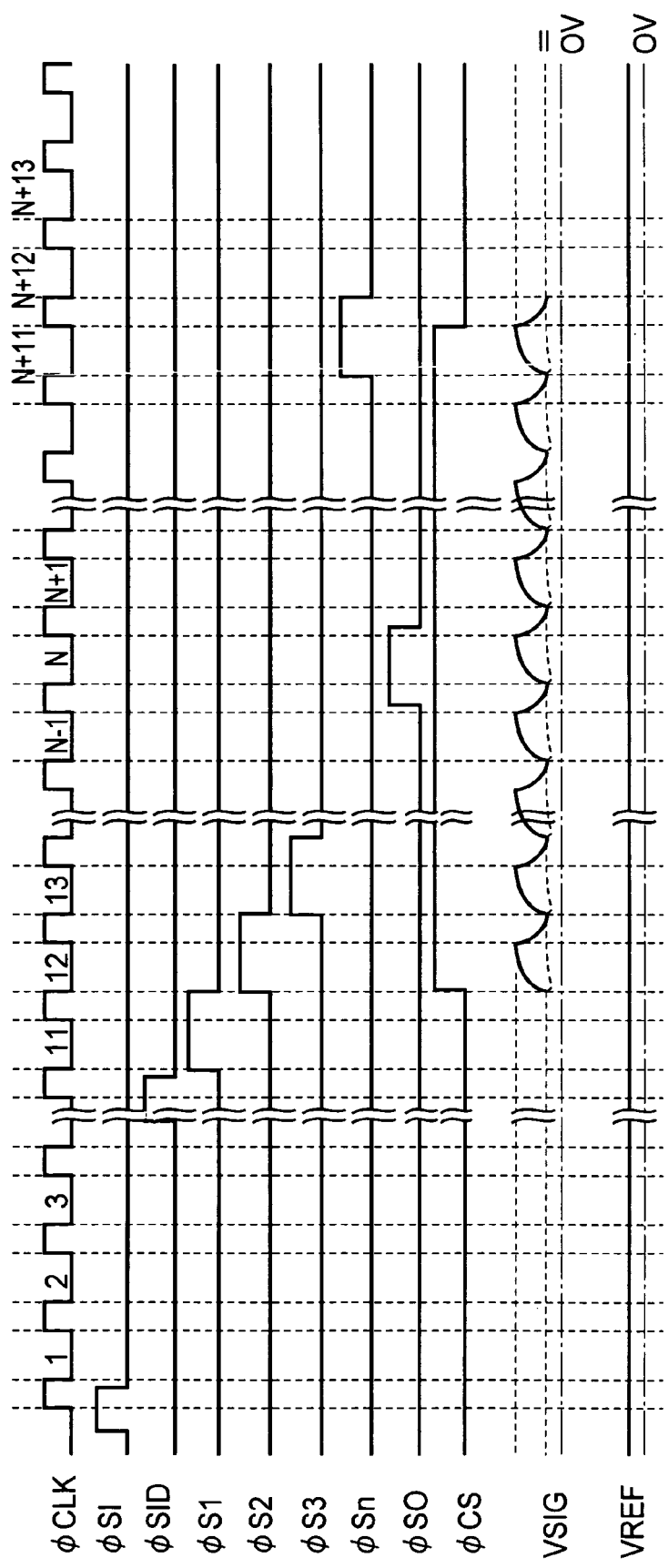
FIG. 4 is a timing chart of the image sensor according to the present invention in the case where a start signal is delayed.
Figure 5:
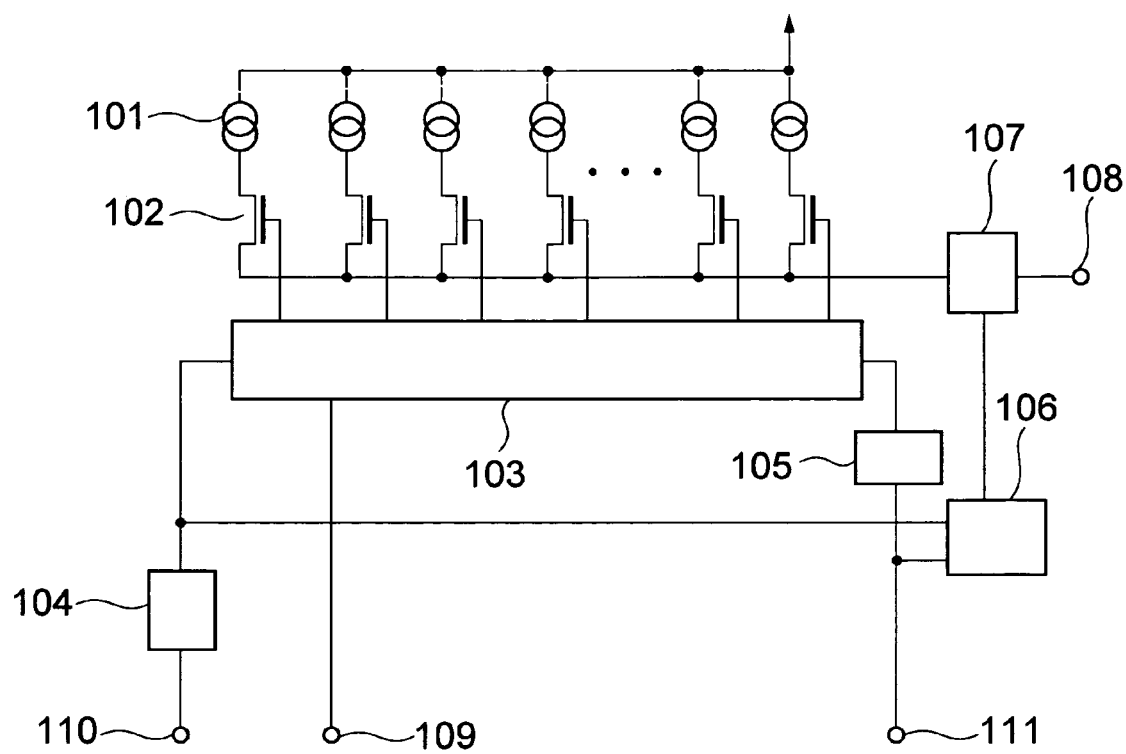
FIG. 5 is a circuit diagram showing a conventional image sensor.

FIG. 4 is a timing chart of the image sensor according to the present invention in the case where a start signal is delayed. Like FIG. 3, reference symbol ØCLK indicates a clock pulse, ØSI is the start signal, and S1, S2, S3 . . . Sn are signals that control the respective read switching elements. The scanning circuit array 1 is the shift register that is formed of n or more flip flop circuits, and generates scanning signals that render the read switching elements sequentially conductive one by one. Reference symbol ØSID is a signal resulting from outputting a signal from the start signal ØSI through the eleven data flip flop circuits of the signal start position timing generator circuit 13 from the output Y of the selector circuit 2A with a delay of 11 clocks because CTRL is low. For that reason, the first output S1 of the scanning circuit array 1 is inputted with the start signal ØSI, and outputted from the twelfth clock. Reference symbol ØSO indicates a start signal of the subsequent image sensor, and the output signal Qn-12 of the scanning circuit array 1 is outputted from the output Y of the selector circuit 2B in order to comply with the logic. Reference symbol ØCS indicates a control signal of the chip select switch element which is rendered conductive in a period until the n-bit image signals of the image sensor that has been selected according to the start signal ØSI are completely outputted. All of them are rendered conductive at a high level, and non-conductive at a low level. VSIG is an image signal output that has been subjected to photoelectric conversion. Reference symbol VREF indicates a reference voltage that is generated in a reference voltage generator circuit of the image sensor, or a reference voltage that is supplied through the reference voltage terminal VREF from the external.

As described above, with the operation of the respective switching elements, the image signal that has been obtained by, for example, the first photoelectric conversion element A1 is inputted with ØSI, and when the first switching element SI is rendered conductive at the twelfth clock, the first common signal line is read. After the image signal has been sufficiently read, the image signal is reset to the reference voltage VREF through the read switching element S1 by the reset and control circuit in a period when ØCLK is at a high level. In addition, the image signal is clamped to the reference voltage VREF by the clamp switch element in the second common signal line in a period when ØCLK is at a high level.

The above operation is sequentially repeated, the plural read switching elements are controlled, and the image signal is read on the basis of a dark-time output as the reference voltage VREF, to thereby obtain the operation of a line image sensor.

As described above, according to the present invention, in the image sensor corresponding to the specification in which the data loading start position of the signal processing IC is delayed by several clocks to over ten clocks, the delay circuit that delays the start signals, the selector circuit that selects any one of the start signals, and the selector circuit that selects the start signal of the subsequent image sensor IC upon selection of the start signal are disposed in the scanning circuit array that scans the photoelectric conversion element array within the IC, thereby making it possible to provide the image sensor that is capable of loading the output signal from the first photoelectric conversion element.

What is claimed is:

1. An image sensor having a plurality of linear image sensor ICs arranged linearly, the image sensor comprising:
   a photoelectric conversion element circuit array for outputting an output signal according to the amount of received light;
   a switch element circuit array for reading an output of the photoelectric conversion element circuit array;
   a control circuit for controlling a signal that is read from the photoelectric conversion element circuit array; and
   a first reset switch for returning a common signal line that reads a signal read through the control circuit and the photoelectric conversion element circuit array to an initial state, wherein:

the respective output terminals of the photoelectric conversion element circuit array are connected to the respective input terminals of the switch element circuit array;

the respective output terminals of the switch element circuit array are connected to the common signal line;

the common signal line is connected to a first electrode of the first reset switch;

a second electrode of the first reset switch is connected to a reference potential terminal that is an initial potential;

an image signal outputted from the common signal line is connected to the input terminal of a chip select switch that selectively functions;

the output terminal of the chip select switch is connected to the signal output terminal;

a delay element that delays by m clocks corresponding to the scanning circuit is connected in series between an input terminal of a first scanning circuit and a signal start signal terminal which drives the photoelectric conversion element circuit array; and the delay element has a function for delaying the start position of the output signal of the first photoelectric conversion element.

2. An image sensor according to claim 1, wherein;

the input terminal of the scanning circuit is connected to a first select signal;

a first input terminal of a first selector circuit is connected to the signal start terminal;

a second input terminal of the first selector circuit is connected to the output terminal of the delay element; and the start position of the output signal of the first photoelectric conversion element can be arbitrarily controlled by controlling the first selector circuit.

3. An image sensor according to claim 1, wherein:

an output terminal of the scanning circuit is connected to a second selector circuit;

a first input terminal of the second selector circuit is connected to an (n−1) th output terminal of the scanning circuit;

a second input terminal of the second selector circuit is connected to an (n−1−m)th output terminal of the scanning circuit; and a signal that starts the subsequent chip can be arbitrarily selected by controlling the second selector circuit.

* * * * *

UNITED STATES PATENT AND TRADEMARK OFFICE
CERTIFICATE OF CORRECTION

| | | |
|---|---|---|
| PATENT NO. | : 7,630,104 B2 | Page 1 of 1 |
| APPLICATION NO. | : 11/362653 | |
| DATED | : December 8, 2009 | |
| INVENTOR(S) | : Masahiro Yokomichi | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 953 days.

Signed and Sealed this

Second Day of November, 2010

David J. Kappos
*Director of the United States Patent and Trademark Office*